UNITED STATES PATENT OFFICE.

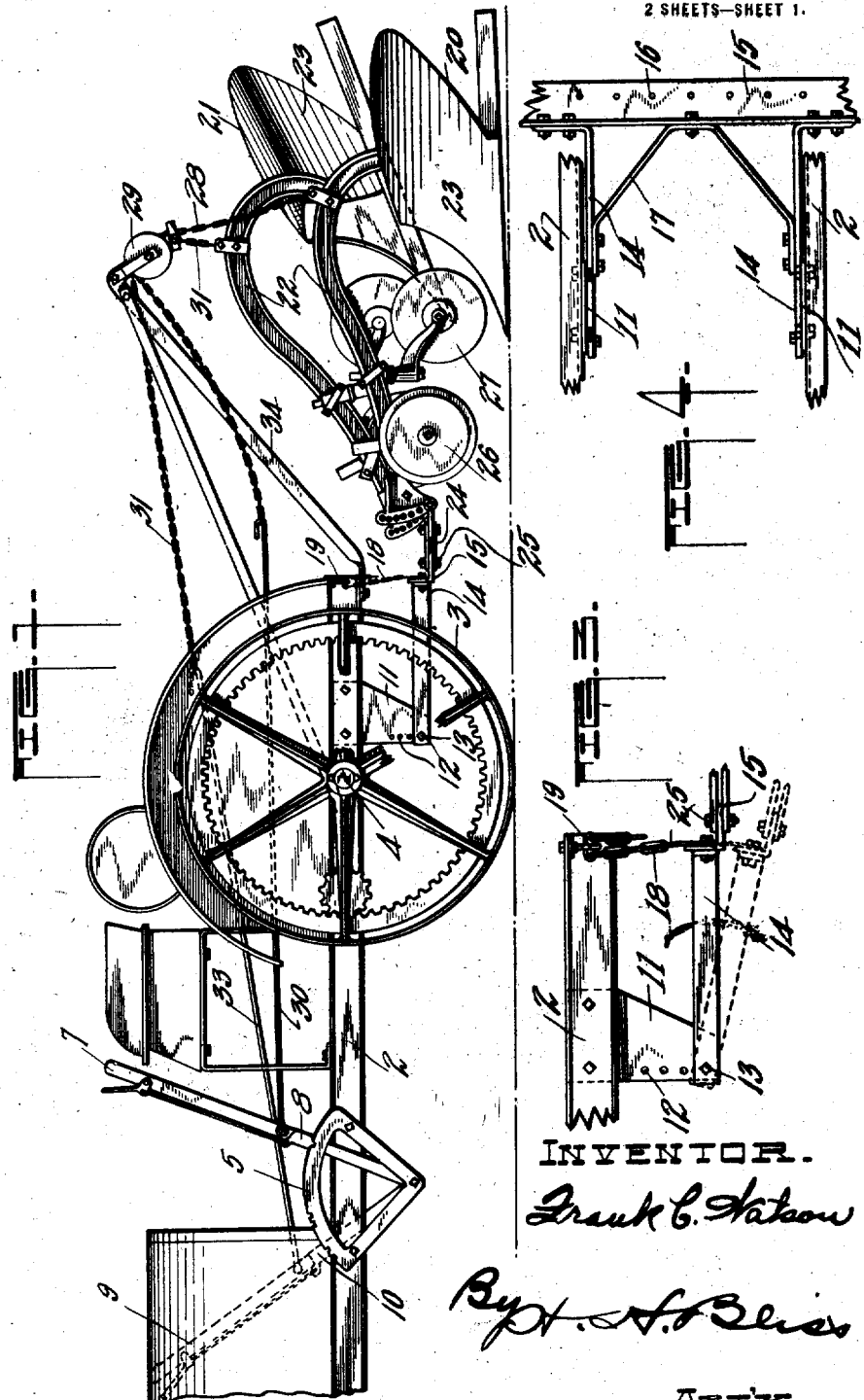

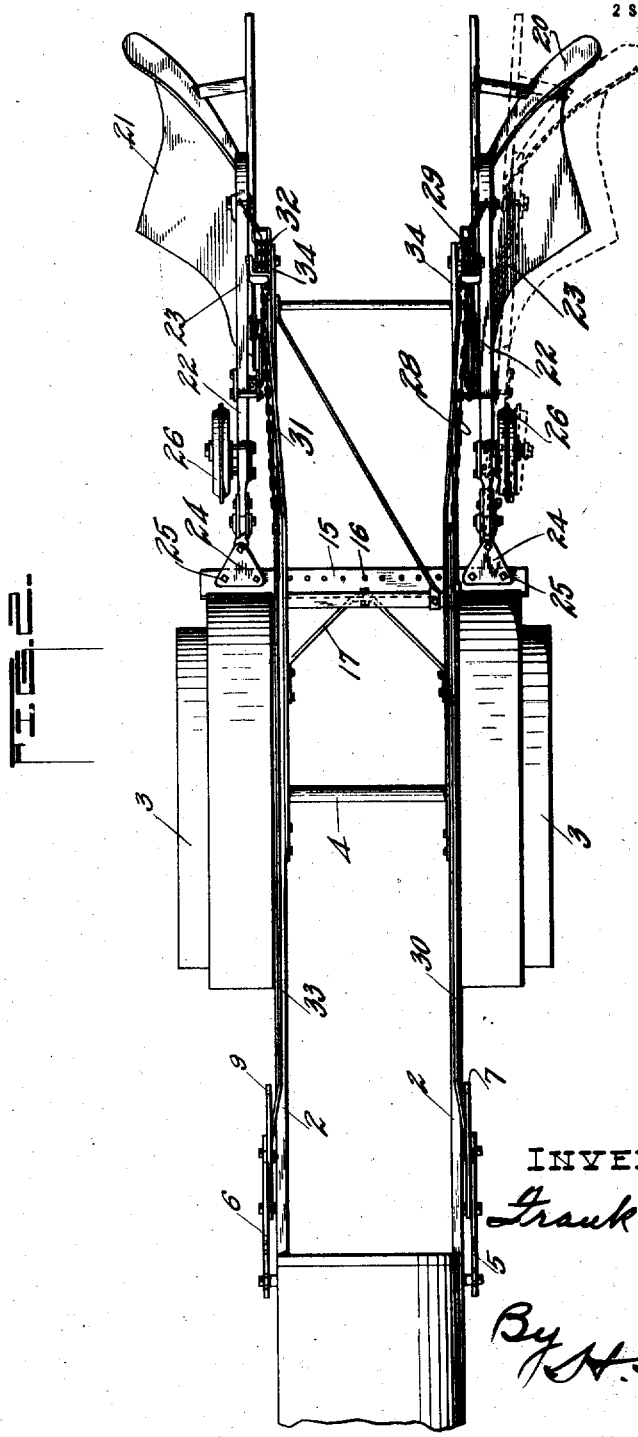

FRANK C. WATSON, OF DES MOINES, IOWA, ASSIGNOR TO AVERY COMPANY, OF PEORIA, ILLINOIS, A CORPORATION OF ILLINOIS.

TRACTOR-PLOW.

1,362,277.  Specification of Letters Patent.  Patented Dec. 14, 1920.

Application filed August 29, 1917. Serial No. 188,823.

*To all whom it may concern:*

Be it known that I, FRANK C. WATSON, a citizen of the United States, a resident of Des Moines, in the county of Polk and State of Iowa, have invented new and useful Improvements in Tractor-Plows, of which the following is a specification.

This invention relates to improvements in plowing mechanisms, each of which comprises a draft frame, power-driven traction wheels near the rear end of the frame, and plow units each having a beam flexibly connected directly to such frame by draft devices positioned near the vertical transverse plane of the wheel axis.

One of the objects is to so connect the several plow units to the frame that the propelling efficiency of the traction wheels can be increased by the weight of one or more plow units, and the weight of the tractor and frame, by themselves considered, be correspondingly reduced. Another object is to provide a means for connecting, in common, two plow units to a tractor frame in such way that they can be independently lifted to their uppermost positions and independently lowered to working lines, the common connecting devices being such as to hold properly either of the plows in the ground while at work, and provide sufficient flexibility whereby either unit can adapt itself to variations in the conditions which it meets. Another object is to provide a mechanism for connecting to a tractor of the sort here contemplated, plow units of any of the various makes; that is to say to provide attaching devices whereby plows primarily designed to be drawn by horses or by a tractor other than such as is herein shown can be connected to one like that herein, and proper provision will be ready for attaining the correct line of draft and for properly supporting the forward parts of each plow unit.

The improvements which I have made are particularly useful in constructing and operating a tractor mechanism having a plow system of which one-half is composed of one or more right-hand plow units and the other half is composed of one or more left-hand plow units. Such arrangement of units is used in constructing "two-way" plows and "hillside" plows.

Figure 1 is a side elevation of the rear half of a well known tractor with my invention employed for attaching plows thereto;

Fig. 2 is a plan view of Fig. 1;

Fig. 3 is a detail side elevation of the adjustable connection between the draw-bar and frame of the tractor, and Fig. 4 is a detail plan view of a part of the draw-bar and connection between said bar and the frame of the tractor.

Like characters of reference denote corresponding parts throughout the figures.

In the drawings, the tractor 1 is provided with the longitudinal spaced side beams or rails 2, the rear traction or driving wheels 3, mounted on the rear axle 4 and adapted to be actuated in any suitable manner from an engine, not shown, mounted on the frame of the tractor.

On one side of the tractor there is a toothed segment 5 and on the other side is a toothed segment 6. Pivoted to the frame and associated with the segment 5 is a lever 7 having a spring pressed detent 8, and pivoted to the frame and associated with the segment 6 is a lever 9 having a spring pressed detent 10. The functions of these levers will be more fully explained in connection with the attachment and operation of the plows.

Connected to and depending from each side beam or rail 2 immediately back of the rear axle 14 is a member 11 provided with a plurality of openings 12, preferably arranged in a row spaced one above the other.

Pivotally connected with each member 11, by means of a bolt 13 passing through any one of the perforations 12, is a bar 14 extending rearwardly of the tractor. Connected with the rear end portions of said bars 14, and disposed transversely of the tractor is a draw-bar 15, which extends preferably across the faces of the traction wheels 3, and the body of said draw-bar is provided with a plurality of openings 16 disposed longitudinally thereof. To brace the draw-bar against motion sidewise of the tractor, an angular bar 17 is provided, bolted to the draw-bar, and having diverging portions bolted to the bars 14. The draw-bar 15 and rear ends of the bars 14 are adjusted into up and down positions by means of link chains 18. These chains have one end connected to the draw-bar 15 and extending upwardly pass through an eye 19 secured to the beams or rails 2 with the free ends depending. To adjust the height of the draw-bar, whereby different plows may have connection therewith, the chains 18 are slipped through the eyes 19 until the proper adjustment is made, when one link is caused to assume the horizontal position shown in Fig. 3, in the eye 19 which will lock the draw-bar in adjusted position.

20 and 21 designate right and left hand plows, each having the usual plow-beam 22 and the plowing element 23. The forward end of each beam 22 is pivotally connected with a coupling 24 which in turn is adapted to have an adjustable connection with the draw-bar 15, by means of bolts 25 passing through either of the openings 16 in said draw-bar. In Fig. 2 the couplings 24 are preferably coupled directly in line with the traction wheels 3 so that the pull on the plow elements is directly in line with the traction power.

Adjustably connected with the forward end of each plow beam 22 is a land wheel 26 which acts as a stop; that is, if the tractor strikes a sharp bump, the land wheel riding over the bump will prevent the plow digging too deep, and said land wheels when adjusted, will regulate the depth the plowing elements will enter the soil. Also connected with each plow beam 22 is a disk 27 which is adapted to travel immediately in front of the plowing element to insure a clean cut furrow.

Connected with the plow beam 22 of the plow 20 is a chain 28. This chain passes over a pulley wheel 29 and its other end is connected with a rod 30 connected with the lever 7. Connected with the plow beam 22 of the plow 23 is a chain 31. This chain passes over a pulley wheel 32 and its other end is connected with a rod 33 connected with the lever 9. It is obvious that the operator of the tractor may by actuating either one of the levers 7 or 9, raise or lower plow 20 or plow 21, as desired.

The pulley wheels 29 and 32 are journaled on a frame 34 extending rearwardly and upwardly from the tractor and braced therefrom in a suitable manner.

With the draw bar connection shown, the plowing elements, when lowered, will automatically find their plowing depth and any tendency to pull upward on the plows is entirely obviated.

The plow body has its parts so constructed and related that the suction will tend at all times to carry its point downward, but this in turn is resisted at the proper time by the land wheel 26, so that the plow after reaching the predetermined depth maintains that depth. The lifting devices 30, 31, etc., are of such dimensions that there will be sufficient slack to permit the plow body to rise somewhat above, or move somewhat below, the normal working line, if occasion demands; and the connecting devices at 11, 14 and 18 permit these self-adjustments.

This plow being designed more especially for hill side plowing, the operator will start plowing at the bottom of the hill working across the hill with the plow on the lower side in plowing position and with the plow on the opposite or upper side raised. After plowing across the hill the tractor will be turned around, and the position of the plows reversed so that the plow which was on the upper side will now be on the lower side in lowered position for plowing and the other plow raised into inoperative position. It is understood that in hill-side plowing, it is always best to turn the furrow down hill. In this way, very little power is used.

It is also understood that the draw-bar 15 may have adjustable connection with the frame of the tractor, and also raised and lowered when adjusted so that it is possible with the means shown, to provide an exceptionally low draw-bar connection for the various makes of plows.

What I claim is:—

1. The combination of a draft frame, traction wheels thereon adapted to be driven by power, two plowing units each comprising a beam and a bottom, a vertically swinging draw bar arranged at right angles to the line of draft and pivotally connected to the said plow units independently of each other, means for suspending said draw bar from the tractor frame, independent lifting and sustaining devices for the plow units for lifting either unit from the ground while the other is in operation and transmitting the weight of the elevated unit to the frame at points near the traction wheels.

2. The combination of a draft frame, traction wheels thereon adapted to be driven by power, a transversely positioned vertically swinging draw bar, means for permanently supporting said draw bar entirely on the draft frame and holding it in horizontal parallelism, two independent plow units, two horizontally and independently adjustable connecting devices for securing said units to said draw bar, and two independent lifting devices on the draft frame respectively connected to the plowing units, each unit being adapted to be lifted out of the ground and held in a relatively elevated position independent of the other unit and while the latter is in operation.

3. The combination of the draft frame, traction wheels thereon adapted to be driven by power, two independent plowing units, a vertically swinging draw bar positioned parallel to the axis of the traction wheels, means for pivotally connecting said bar to the draft frame and permitting it to swing in horizontal parallelism while holding it in horizontal planes, means for limiting the downward movement of said bar, two independent lifting devices on the frame connected to the plowing units, respectively, for lifting either unit independently of the other to a position where it bears downward on the traction wheels.

4. The combination of the draft frame, the transversely positioned draw bar, the vertically adjustable means carried by the frame for holding the draw bar in horizontal parallelism and in lines at right angles to the lines of advance, two plowing units independently connected to the draw bar by vertically and horizontally adjustable hinge devices, and two independent lifting mechanisms on the frame connected respectively to the plowing units.

5. The combination of a draft frame, a draw bar at right angles to the line of advance, vertically adjustable means on the frame for holding the draw bar in horizontal parallelism and at right angles to the line of advance while said bar swings vertically, two independent plowing units each having a bottom, a beam and a front gage wheel secured to the beam, means for adjustably connecting each of said plowing units with said draw bar independently of the other, and two independent lifting and supporting mechanisms on the frame, one for each plow unit and adapted to lift all of the parts attached to its unit from the ground and sustain them from the frame.

In witness whereof, I have hereunto affixed my hand this 21st day of August, 1917.

FRANK C. WATSON.